United States Patent [19]

Oirschot

[11] Patent Number: 5,328,301
[45] Date of Patent: Jul. 12, 1994

[54] AIR RETURN FOR VENTURI SYSTEM

[76] Inventor: Frank V. Oirschot, 47 Algonquian Drive, Chatham, Ontario, Canada, N7M 5Y2

[21] Appl. No.: 5,986

[22] Filed: Jan. 19, 1993

[51] Int. Cl.⁵ ............................................. B65G 53/60
[52] U.S. Cl. ..................................... 406/171; 406/191
[58] Field of Search ............... 406/106, 168, 171, 172, 406/175, 191, 193; 138/44, 106, 112

[56] References Cited

U.S. PATENT DOCUMENTS

| | | | |
|---|---|---|---|
| 2,772,925 | 12/1956 | Dygert | 406/193 |
| 4,083,607 | 4/1978 | Mott | 406/171 |
| 4,540,421 | 9/1985 | Wilson | 406/171 X |
| 5,252,007 | 10/1993 | Klinzing et al. | 406/191 X |

FOREIGN PATENT DOCUMENTS 823003  9/1969  Canada ................................ 406/193

Primary Examiner—David M. Mitchell
Assistant Examiner—Andrew C. Pike

[57] ABSTRACT

An air return is useable in a venturi system having an upstream air induction member feeding a product flow line downstream of the air induction member. The air return itself comprises a housing having a product flow region to be fitted in line with the product flow line, an air draw region separated from the product flow region by a perforate divider with a baffle internally of the divider and an air flow line from the housing to be fitted back to the air induction member.

6 Claims, 5 Drawing Sheets

FIG.8.
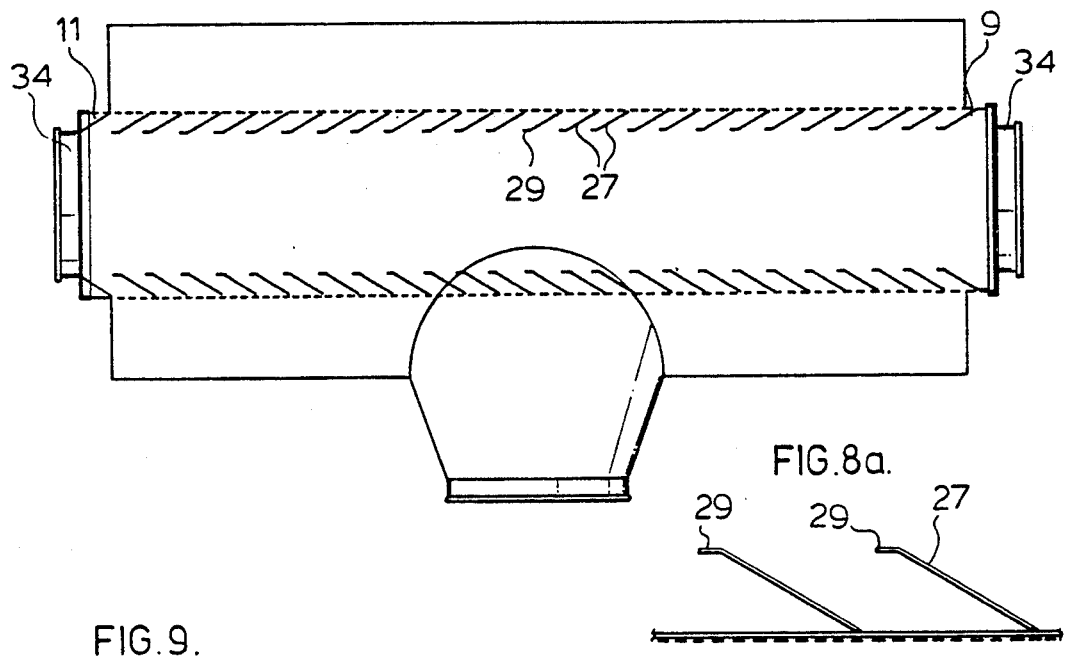
FIG.8a.
FIG.9.
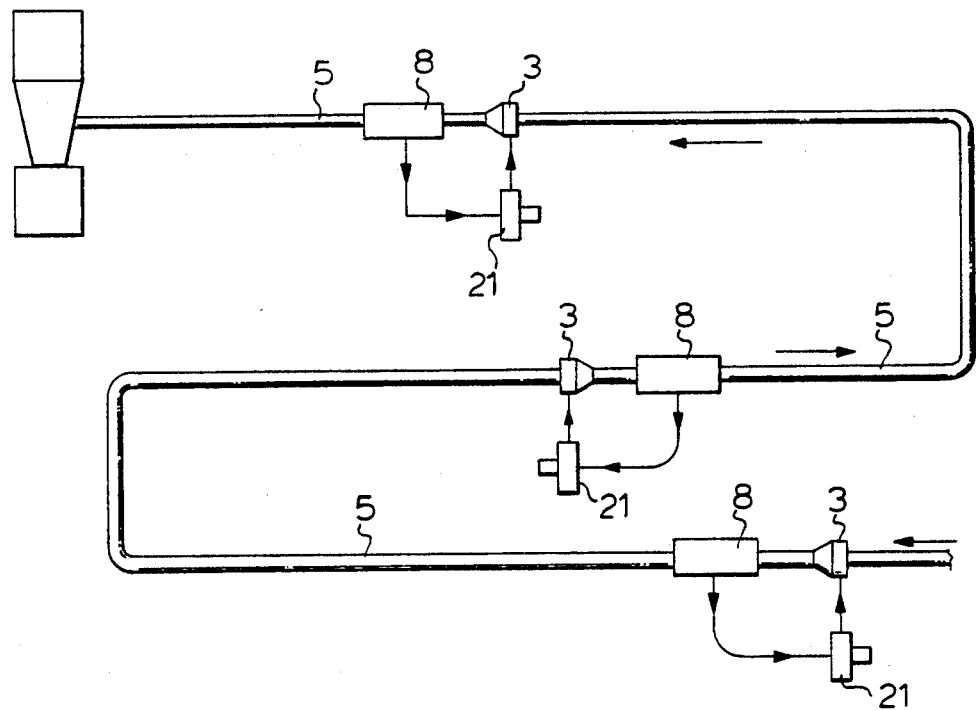

AIR RETURN FOR VENTURI SYSTEM

FIELD OF THE INVENTION

The present invention relates to an air return which is used in an inline venturi system.

BACKGROUND OF THE INVENTION

In line venturi systems are used to move product from place to another. An example of an inline venturi system is described in my own U.S. Pat. No. 5,002,092 issued Mar. 26, 1991 where I use a blower feeding air to a venturi device to create a low pressure region causing air to be drawn into and through the system.

One of the keys to my earlier patented system is the use of a static regain chamber downstream of the venturi device which substantially enhances capacity of my system.

In line venturi systems are typically limited in the length of conduit that they can service simply because the amount of air flow that can be generated at the upstream end of the conduit drops over the length of the conduit. After a certain conduit length, the air flow drops to the point that the product will no longer move through the conduit. With prior art techniques, the only way to overcome this problem is to first drop the material into a settling box or cyclone and then pick it up with a further venturi and blower. This will not work with certain types of material such as continuous strips of material because the material would ball up once it is settled into the box. Furthermore, whenever dust is associated with the product and you drop it into the settling box or cyclone it creates a serious dust problem. This requires the addition of a dust collection substantially adding to the cost of the prior art systems.

SUMMARY OF THE INVENTION

The present invention relates to an air return which is used in an inline venturi system of the type having an upstream blower operated air induction member causing a flow of induced air to move through a conduit downstream of the air induction member.

The air return itself comprises a housing having a product flow region to be fitted inline with the conduit and an air draw region separated from the product flow region by a perforate divider. A baffle is provided internally of the divider. The air return further includes an air return line from the air draw region to be fitted back to the negative pressure side of the blower of the air induction member.

The air return not only provides the static regain, but in addition, because air is drawn from it by the blower, it causes increased draw through the conduit at the location of the air return. Therefore, by adding as many venturies, air returns and blowers as are necessary, the length of the conduit can be virtually limitless.

BRIEF DESCRIPTION OF THE DRAWINGS

The above as well as other advantages and features of the present invention will be described in greater detail according to the preferred embodiments of the present invention in which;

FIG. 8 is a sectional view through the air return unit of FIG. 1;

FIG. 8a is an enlarged sectional view through some of the conical baffles used in the air return unit of FIG. 2.

FIG. 9 is a schematic view of an alternate venturi system from that shown in FIG. 1 incorporating a plurality of blowers, ventures and air returns feeding in a common direction.

DETAILED DESCRIPTION ACCORDING TO THE PREFERRED EMBODIMENTS OF THE PRESENT INVENTION

Figure 1:
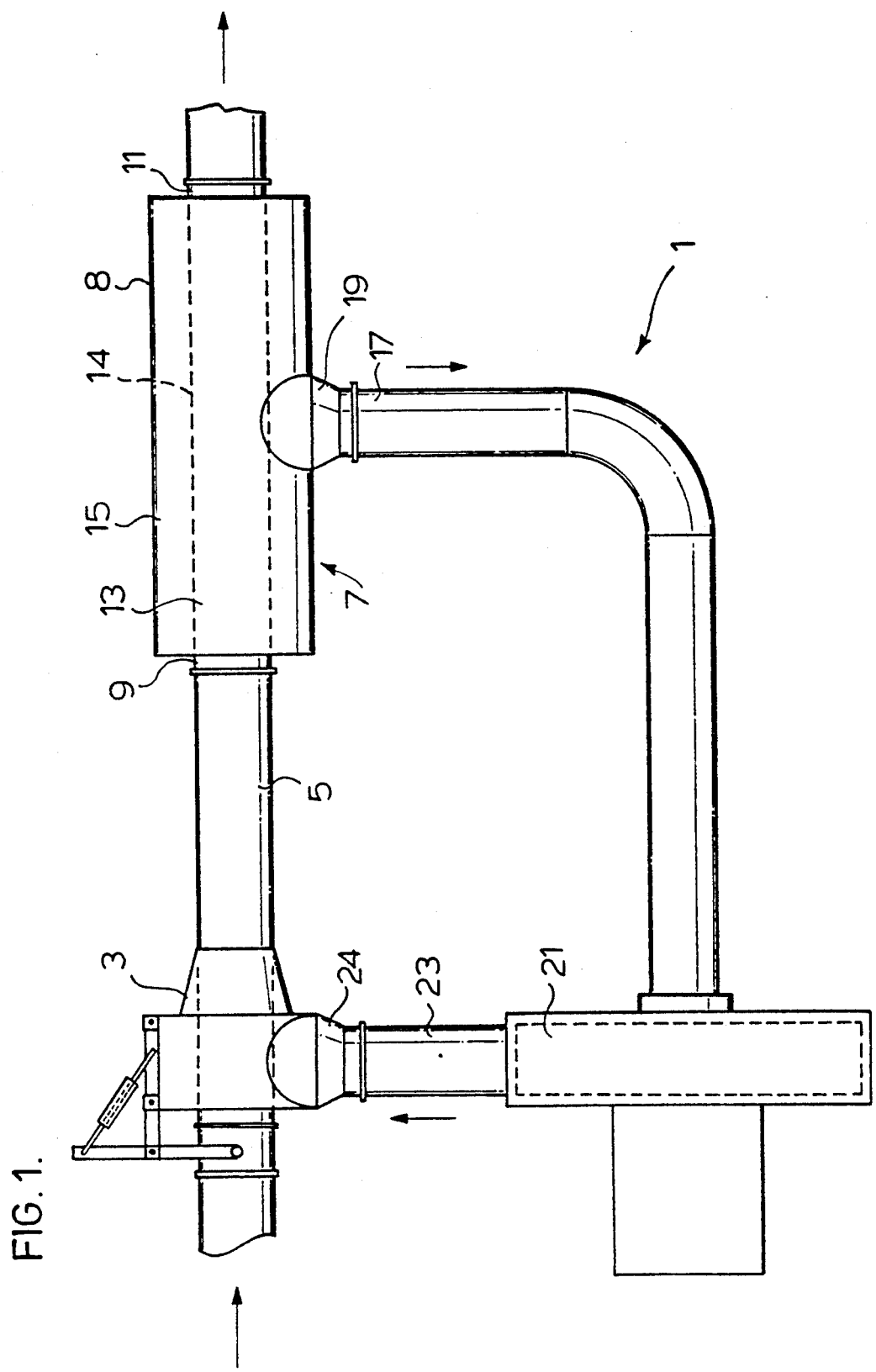
FIG. 1 is a schematic view of a venturi system fitted with an air return unit in accordance with a preferred embodiment of the present invention.

FIG. 1 shows a pneumatic conveying system generally indicated at 1. This system, like the system in my earlier issued patent has an air induction venturi member generally indicated at 3 at the upstream end of the system. A product and air flow conduit 5 is located downstream of the venturi device.

In my earlier patent, I describe the use of a static regain provided in the product flow conduit. This static regain, according to my earlier patent, is a very simple expansion of the conduit.

In the present application, rather than simply enlarging the conduit, I provide an air return unit generally indicated at 7. This air return unit not only forms a static regain, but in addition, substantially enhances the draw through the product flow conduit. This is achieved because the blower generally indicated at 21 which is used to operate the venturi device 3 draws its air from the air return unit and feeds that air to the venturi device, therefore, not only is there an air induction at the upstream end of the system, but in addition, there is an air draw through the air return unit pulling product downstream along the product flow conduit.

In order to produce an essentially endless venturi system, a series of air return units, and ventures may be provided at spaced intervals along the length of the conduit. Furthermore, if required, additional venturi devices may also be provided.

Figure 2:
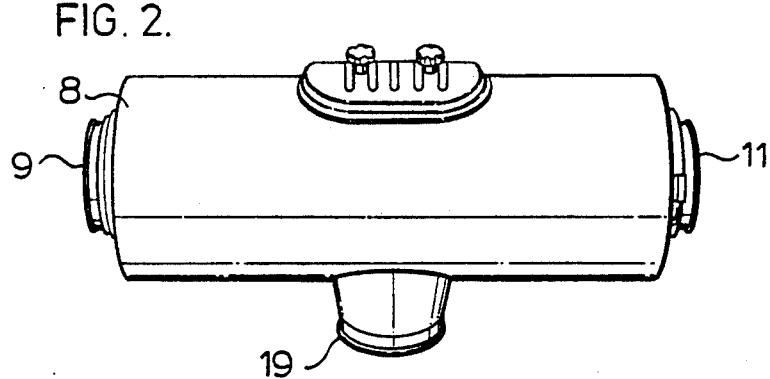
FIG. 2 is a perspective view of the air return unit when removed from the system of FIG. 1.
Figure 6:
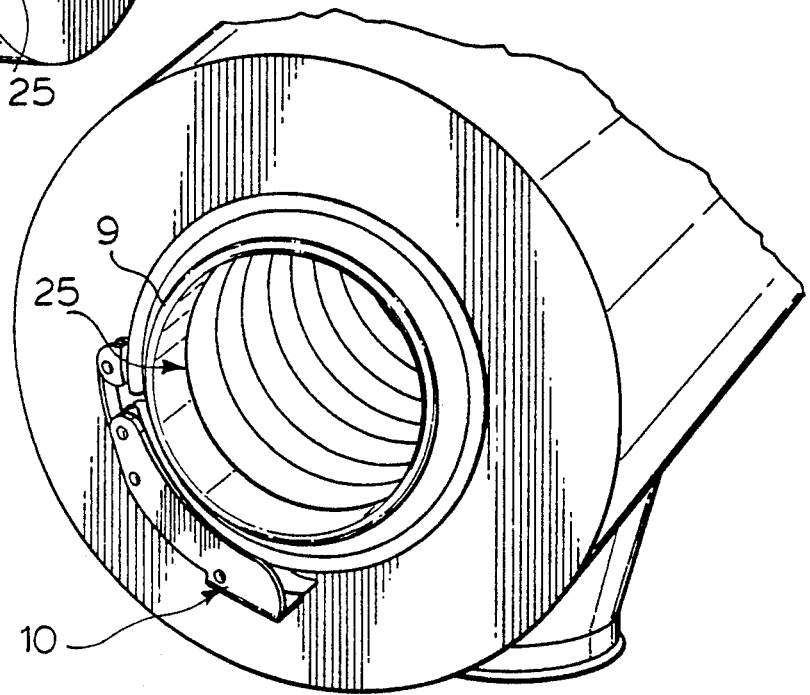
FIG. 6 is an end view of the housing with baffle arrangement after assembly.

The air return unit itself comprises a main housing 8 having end connections 9 and 11 for fitting directly into the conduit 5. A quick connect clamp 10 is provided at end connection 9 as seen in FIG. 6 of the drawings. Internally of housing 8 is a product flow through region 13 which, as can be seen in FIG. 1 is directly in line with and forms a continuation of conduit 5. An air draw region 15 surrounds the product flow region 13 and the two regions are separated from one another by means of a perforated screen 14. In the preferred embodiment, the air return unit, like the product flow conduit has a rounded configuration as best seen in Figure 2 of the drawings, and the screen dividing the product flow region form the air draw region is rolled upon itself in a cylindrical configuration.

Again, according to the preferred construction, screen 14 is more open than it is closed, i.e. it comprises about 40% screen body and about 60% openings through the screen body. The screen therefore allows a very substantial movement of air from the product flow region to the air draw region. However, at the same time, the screen acts to filter product carried by the air flow from moving from the product flow region into the air draw region.

The air return unit is looped or coupled back to the negative pressure side of fan 21 by means of an air return line 17. The air return line includes a divergent mouth 19 opening through the wall of housing 8 to the air draw region. The divergent shaping of mouth 19 adds to its efficiency in that it tends to draw air from all around the entire unit whereas, a straight mouth would tend to have a much more localized air draw. It is to be noted in Figure 1 that the mouth 19 of air return line 17 is of substantially the same configuration as the mouth 24 of air line 23 through which air is provided by the blower to the venturi device 3. This provides a balance of air flow from the air return unit back to the venturi.

In addition screen 14 with its open mesh construction provides an extremely efficient air spreader to once again assist in equalizing the air draw circumferentially and longitudinally of the air return unit rather than having a much more localized draw which would have a much greater tendency to undesirably pull the product into the screen.

In one embodiment of the present invention, the air return unit is provided with an internal baffle assembly generally indicated at 25. This baffle assembly as best seen having reference to FIGS. 3 through 8 of the drawings is provided to prevent clogging of screen 14. It allows the air to be drawn from the product flow region but blocks the product itself from being dragged into the screen.

Figure 3:
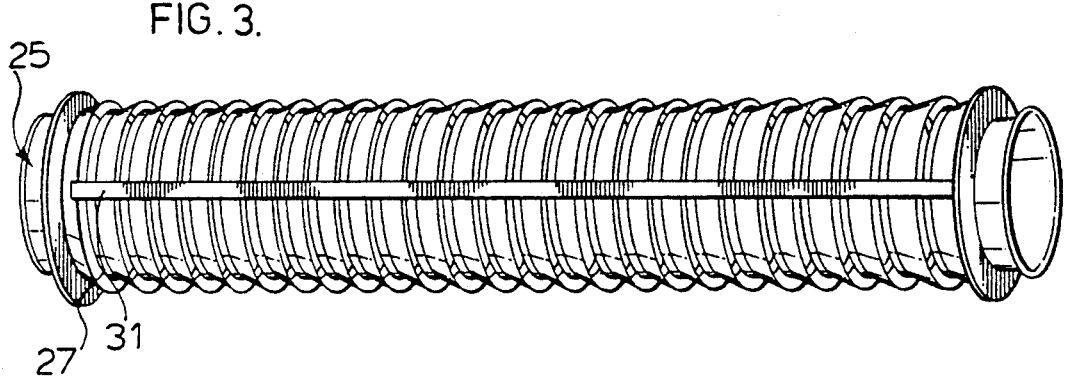
FIG. 3 is a perspective view of an internal baffle arrangement used within the air return unit of FIG. 2.
Figure 4:
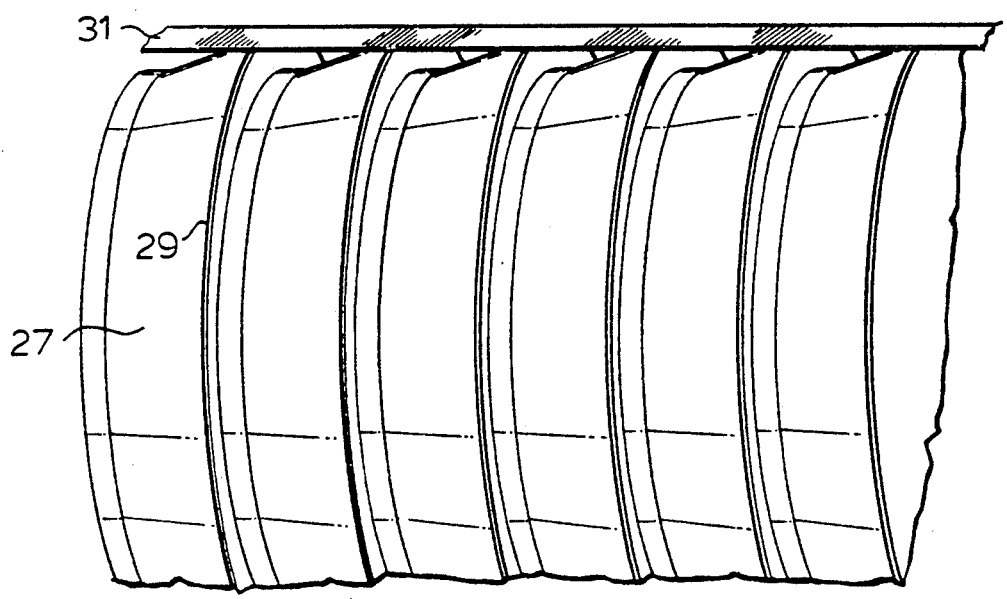
FIG. 4 is an enlarged perspective view of a section from the baffle unit of FIG. 3.

The actual construction of the baffle assembly is best shown in FIG. 3 of the drawings. It is formed by a plurality of generally conical members 27 which are secured side by side in line with one another by means of a baffle frame comprising a longated securing strips 31 provided at circumferentially spaced intervals around the baffle assembly. The opposite ends of each of the strips 31 are secured to an end cap which terminates in an extended mouth 34. As best seen in FIG. 8 of the drawings, each of the mouths 34 extends beyond the coupling ends 9 and 11 of the air return unit. As best seen in FIG. 6 of the drawings, the air return unit itself includes a quick connect coupler, one being provided at each end of the unit for direct connection of the air return unit to the product flow line with the opposite end mouths 34 of the baffle unit being fitted to the inside of the conduit.

Each of the cones 27 is turned or bent at its inner free end 29 to lie essentially parallel with the direction of air movement through the air return unit. This is best seen having reference to FIGS. 8 and 8a of the drawings. The bending of the cone ends parallel to the direction of air flow reduces turbulence in the air return unit. It also prevents product from catching on the end of the cone. Furthermore, it eliminates anything in the way of sharp edges to which product would otherwise be exposed while moving downstream to the baffle.

The baffle assembly provides a guide for product flowing through the air return unit and because of the downstream angling and substantially overlapping positioning of the cones, they prevent product from moving outwardly to the dividing screen between the product flow region and the air return region of the unit. However, because of the radial gapping between the cones, they do not adversely affect the air draw from the product flow region to the air draw region of the unit.

Figure 5:
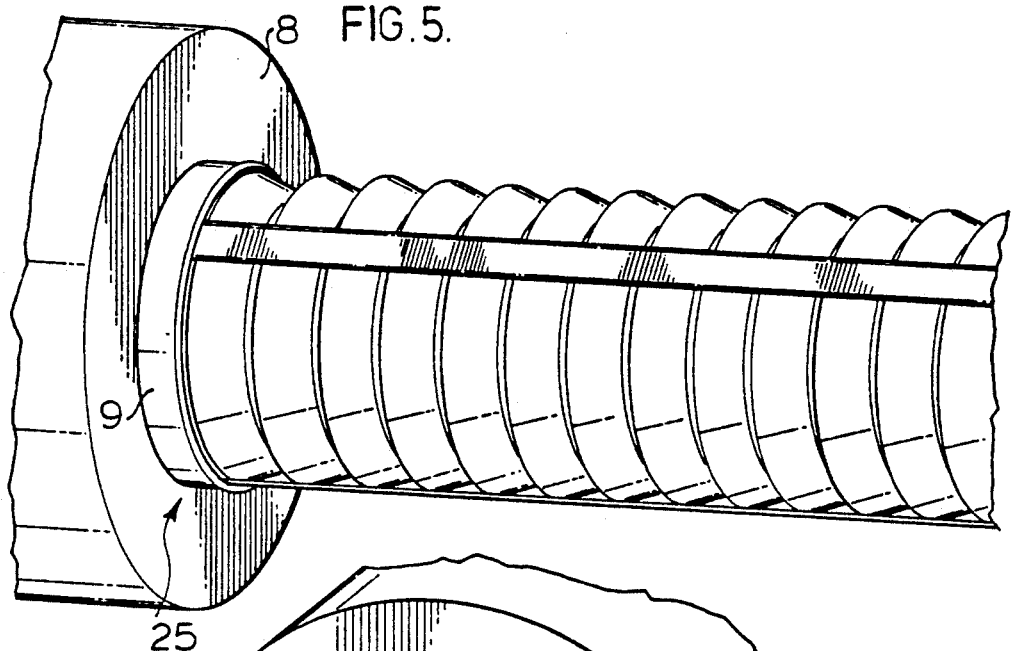
FIG. 5 is a perspective view showing insertion of the baffle unit of FIG. 3 into the housing of the air return unit of FIG. 2.

As clearly described above, the baffle assembly is put together as a unitary structure outside of the air return unit. This unitary structure is then fitted into one end of the air return unit as shown in FIG. 5 of the drawings. The fully inserted position of the baffle or assembly is shown in FIG. 6 of the drawings.

When working with the baffle assembly the diameter of the screen is widened relative to the product flow conduit into the air return unit leaving room for the baffle assembly so that the interior diameter of the cones matches the interior diameter of the conduit once again maintaining a uniform product flow passage through the system.

The above above assembly of the air return unit is very simple and efficient. As will be appreciated the baffle assembly can be removed just as easily from the air return unit if needed for maintenance purposes. In addition, screen 14 can also be made removable from the unit for cleaning and the like.

Figure 7:
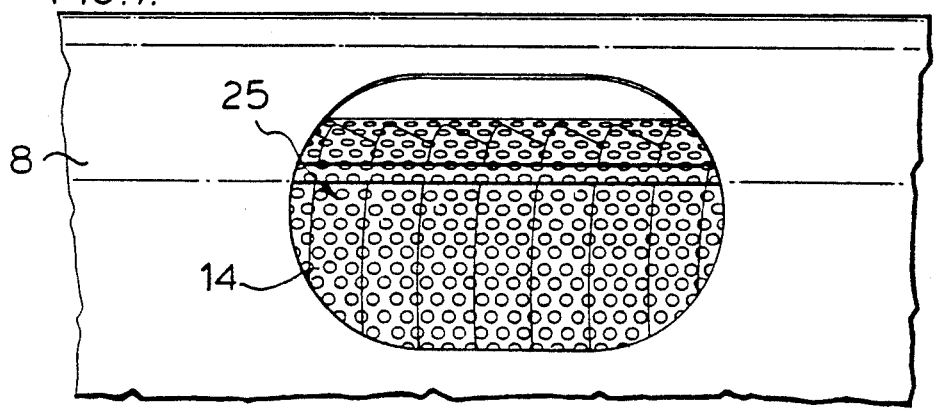
FIG. 7 is a perspective view of a region of the housing of FIG. 2 with part of the housing removed for inspecting the internal construction of the air return unit.

As best seen in FIG. 2 of the drawings, the housing 8 of the air return unit includes a removable cover plate. FIG. 7 of the drawings shows the housing with the cover plate removed which allows easy inspection of the interior of the air unit.

FIG. 9 shows a system incorporating a plurality of air return units 8, each cooperating with an associated venturi 3 and blower 21 and feeding along a common feed path 5. As will be seen, when using the air return units there is no need to add settling boxes and dust collectors. The system of FIG. 9 is extremely simple and efficient and can be extended to substantially any desired length.

Figure 10:
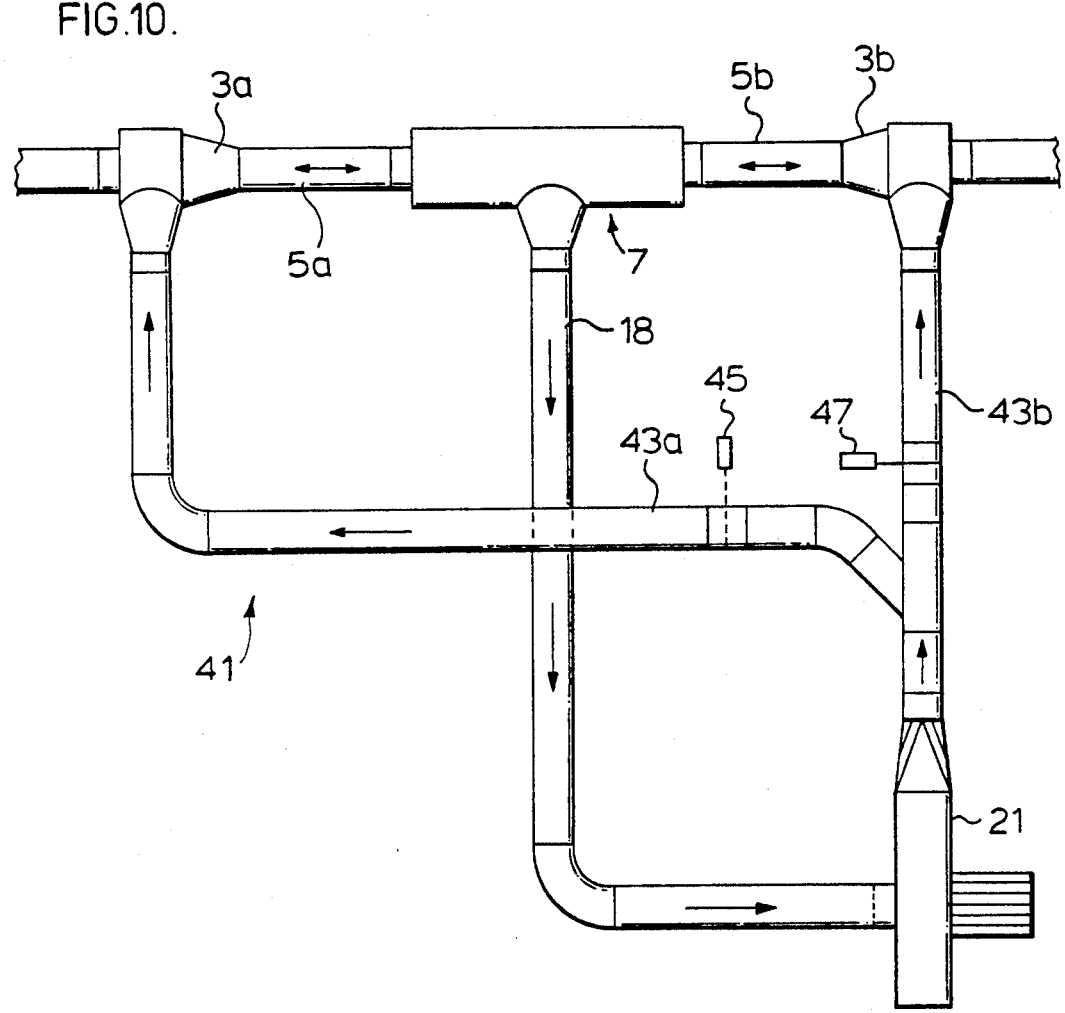
FIG. 10 is a schematic view of still a further venturi system reversible in direction of operation..

The system shown in FIG. 1 feeds in one direction only. FIG. 10 shows a further venturi system generally indicated at 41 which is reversible in its direction of feed. This system includes a pair of venturi devices 3a and 3b both of which operate using a single blower 21 common to both venturi devices. Blower 21 supplies induction air along air flow path 43b feeding to venturi device 3b or in the alternative along air flow path 43a feeding venturi device 3a. A shut off device 45 is provided in flow path 43a and a shut off device 47 is provided in flow path 43b.

Located between the two venturi devices 3a and 3b are conduit sections 5a and 5b with air return unit 7 being placed between the two conduit sections. Air return unit 7, feeds to an air return path 18 back to blower 21.

If it is desired to operate the system such that the product flows from the left to the right hand side of system 41, i.e. from venturi device 3a towards venturi device 3b, shut off 47 in flow path 43b is closed and shut off device 45 is left open such that the induction air from blower 21 feeds to venturi device 3a along flow path 43a and the return air is drawn along line 18 back to the blower. In this example, conduit section 5a, the air return unit, conduit section 5b and venturi device 3b are all located downstream of venturi device 3a.

If it is desired to have product flow in the opposite direction, then shut off device 45 is closed and shut off device 47 is open. Blower 21 then feeds induction air along line 43b to venturi device 3b. The return air from the air return unit feeds identically, i.e. along line 18 and back to blower 21.

Regardless of the direction of flow, only a single air return unit is required because of its symmetrical construction very similar to the construction used in air return unit 8 earlier described, except in this case it is preferable to eliminate the baffle assembly which might otherwise catch product flowing against the taper of the baffle cones in the baffle.

It also should be noted that each of the venturi devices has an essentially straight through internal construction which allows product to flow completely through therein if desired.

The shut off devices 45 and 47 can either be automatically or manually operated. Furthermore, they can be replaced with a single diverter located at the juncture of the air flow paths 43a and 43b. The diverter would then be appropriately positioned to direct air flow to either one or the other of the two air flow paths and shut off the flow of air to the unselected path.

The reversible system as described immediately above has many different applications and one of particular note is for use as an office message transmission system.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An air return unit for use in a venturi system controlled by a blower operated air induction device, said air return unit comprising a housing having first and second ends which open into said housing, a product flow retention centrally through said housing, with baffle means interiorly of said product flow region, said product flow region being surrounded by an air draw region and being separated from said air draw region by a perforate divider, said baffle means comprising a plurality of baffle members along the length of said air return unit with openings between said baffle members from said product flow region to said air draw region, said housing further including an air draw opening from said air draw region to be coupled to an induction device air return line said baffle means inhibiting product which flow through said product flow region from being drawn onto and blocking air draw through said perforate divider.

2. An air return unit as claimed in claim 1 wherein said perforate divider comprises a meshed screen rolled upon itself in a tubular configuration, said screen having a surface area which is more than 50% open.

3. An air return unit as claimed in claim 2, wherein said baffle means comprises a unitary baffle assembly internally of said screen in said product flow region.

4. An air return unit as claimed in claim 3, wherein said baffle assembly comprises a plurality of conical rings secured in spaced relationship to one another by a plurality of elongated securing strips circumferentially spaced at discrete locations from one another around each of said rings of said baffle assembly leaving air draw gaps between each securing strip.

5. An air return unit as claimed in claim 4 wherein each conical ring has an inner free end bent rearwardly of the ring.

6. An air return unit as claimed in claim 1, wherein said air draw opening diverges outwardly open to said air return unit to provide a balanced air draw around said unit.

* * * * *